Feb. 6, 1923. 1,444,119.
M. R. HEDLUND ET AL.
STABLE CLEANING DEVICE.
FILED FEB. 6, 1922.
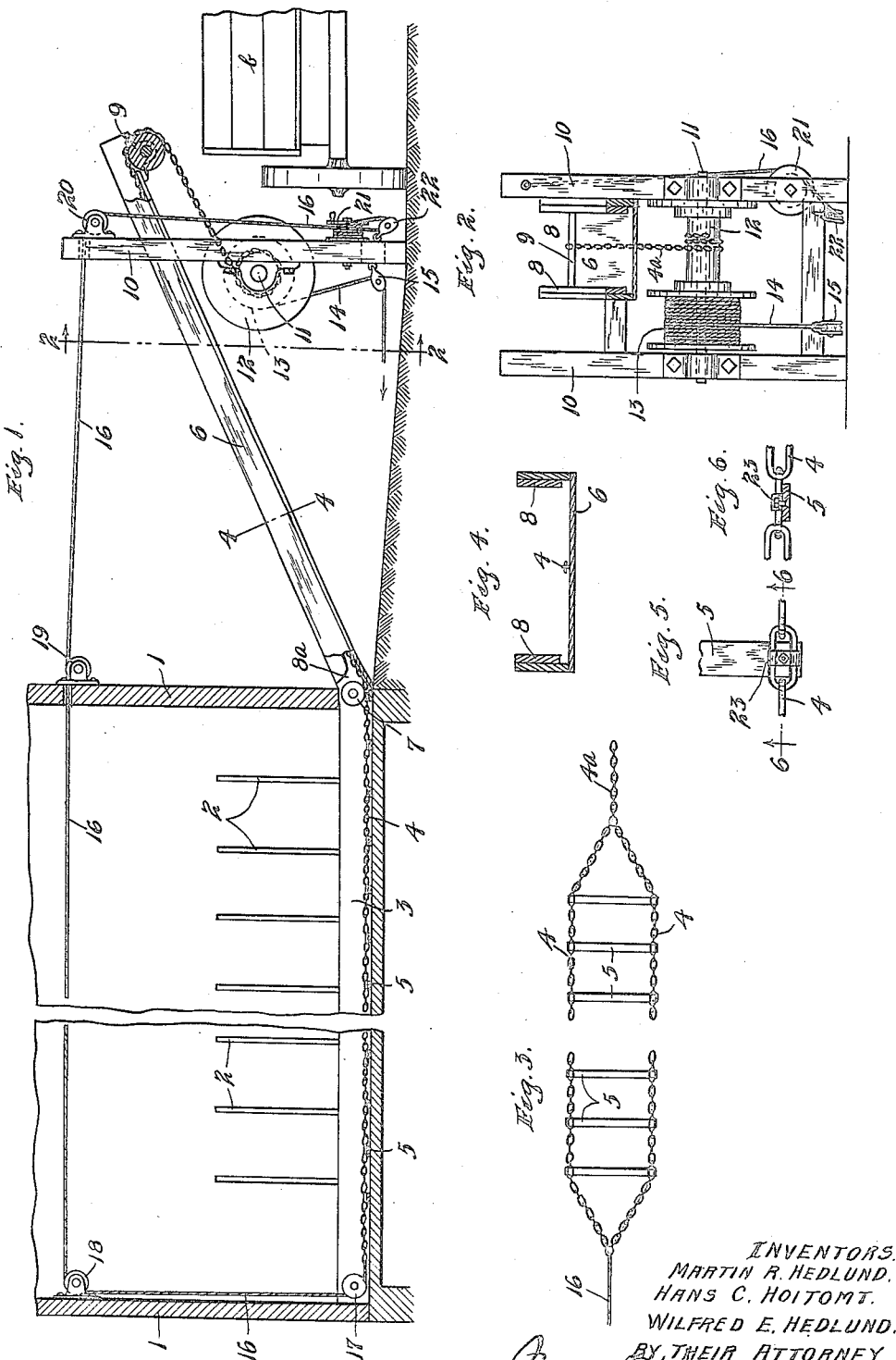
INVENTORS.
MARTIN R. HEDLUND.
HANS C. HOITOMT.
WILFRED E. HEDLUND.
BY THEIR ATTORNEY.
James F. Williamson Patented Feb. 6, 1923.

1,444,119

UNITED STATES PATENT OFFICE.

MARTIN R. HEDLUND, HANS C. HOITOMT, AND WILFRED E. HEDLUND, OF BOYCEVILLE, WISCONSIN.

STABLE-CLEANING DEVICE.

Application filed February 6, 1922. Serial No. 534,439.

*To all whom it may concern:*

Be it known that we, MARTIN R. HEDLUND, HANS C. HOITOMT, and WILFRED E. HEDLUND, citizens of the United States, residing at Boyceville, in the county of Dunn and State of Wisconsin, have invented certain new and useful Improvements in Stable-Cleaning Devices; and I do hereby declare the following to be a full, clear, and exact description of the invention, such as will enable others skilled in the art to which it appertains to make and use the same.

This invention relates to a stable cleaning device of a type comprising a flexible conveyer adapted to be disposed in the trough formed in the rear of the stable stalls and to be moved to and from discharging position.

It is an object of this invention to provide such a conveyer, together with simple and efficient means, which can be inexpensively made and installed for moving the same to and from discharging position.

It is a further object of the invention to provide an upwardly inclined discharge trough for the conveyer having a substantially free upper end beneath which a wagon may be disposed to receive the discharged material.

It is still another object of the invention to provide means for moving the conveyer to discharging position, and means for pulling the same back to its normal position, which means are disposed largely under the said trough.

These and other objects and advantages of the invention will fully appear from the following description made in connection with the accompanying drawings in which like reference characters refer to the same parts throughout the different views, and in which, Fig. 1 is a view in side elevation of the device, the stable structure and other parts thereof being shown in section;

Fig. 2 is a view in vertical section taken on the line 2—2 of Fig. 1, as indicated by the arrows;

Fig. 3 is a plan view of the conveyer;

Fig. 4 is a vertical section taken on the line 4—4 of Fig. 1;

Fig. 5 is a fragmentary plan view showing the structure of the conveyer; and

Fig. 6 is a vertical section taken on the line 6—6 of Fig. 5.

Referring to the drawings, the walls of a building comprising an animal barn or stable are shown as 1, the partitions between the various animal stalls therein being indicated as 2. A trough is usually formed in the floor of such a stable in the rear of the animal stalls, which trough is indicated as 3. A conveyer comprising side chains 4 and transverse flat slats 5, preferably of metal, are adapted to be disposed in the bottom of said trough. The discharge trough 6 is provided and forms a continuation of one end of the trough 3. The discharge trough extends upwardly from the end of the trough 3 and the upper end thereof is adapted to be substantially free so that a wagon $b$, or other desired receptacle, can be moved thereunder to receive the discharged material. Guide sheaves 7 for the chains 4 are disposed at each side of the trough 3 at the point of junction of the said trough and the trough 6. The trough 6, as shown, is preferably of substantially rectangular shape and is provided at its inner sides with strips 8 spaced from the bottom thereof forming a guiding and holding means for the conveyer slats 5 and the chains 4. The conveyer chains 4, as shown in Fig. 3, converge at the ends of the conveyer and are connected to a single chain $4^a$. At the upper end of the trough 6, a roller 9 is rotatably mounted in brackets secured to the underside of the trough, which roller projects slightly above the bottom of said trough. The trough 6 is supported by spaced posts 10 located at some distance from the end thereof and a shaft 11 is rotatably mounted in brackets secured to each of these posts and extends therebetween. A drum 12 is secured to this shaft and has a small central portion around which the chain $4^a$ is adapted to wind, and also has side portions of larger diameter arranged to receive the chains 4 when the conveyer is wound on said drum. Adjacent the drum is a windlass drum 13 adapted to receive and have secured thereto a pull-out cable 14. The end of this cable extends downwardly and over a swiveled sheave-carrying block 15 secured to a crosspiece extending between the posts 10.

The conveyer chains 4 also converge at the rear end of the conveyer and a pull-back cable 16 is secured to the ends of said chains and extends over a sheave 17 located at one end of the trough 3. This cable is then led over an overhead sheave 18 secured to the stable wall and over another sheave 19 vertically alined therewith secured in a bracket on the exterior of the stable wall. The cable then passes over another sheave 20 secured to one of the supports 10 and vertically alined with the sheaves 18 and 19. From the sheave 20, the cable 16 passes downwardly over a flanged drum 21 rotatably mounted on one of the supports 10 and from this drum the end of the sheave passes through a swiveled sheave block 22.

As stated, the conveyer slats 5 are in the shape of flat bars preferably of metal and these bars extend to the outside of the chains 4 and are secured thereto by suitable clips 23 bolted to the slats.

In operation, the conveyer will normally be disposed in a trough 3 and when a certain amount of refuse has collected thereon, the same will be pulled up through the trough 6 and wound around the drum 12, the material being discharged off the upper edge of the trough into a suitable wagon *b* or other receptacle. To so move the conveyer, the pull-out cable 14 will be pulled and this is preferably done by hitching a team or tractor to the end of said pull-out cable. Owing to the swiveled sheave block 15, the team can move in any convenient direction in order to pull out the cable. As the cable is drawn out, the drum 13 will be turned, thus turning the drum 12 and winding up the conveyer thereon. As the conveyer travels outwardly, the pull-back cable 16 will be drawn along therewith. When the ends of the chains 4 pass the sheave 7, it will be apparent that the sheaves will no longer hold the conveyer in the bottom of the trough. For this reason, the guides 8 are provided at the sides of the trough 6 and such guides are provided with curved ends 8ª so that the conveyer and chains will pass easily thereunder. Without these guides 8, the conveyer would tend to lift into a line between the sheaves 9 and 17 and the material would be spilled out of the trough. When the conveyer has been entirely discharged, the team of horses or tractor will then be hitched to the end of the pull-back cable 16. As this cable also passes over a swiveled sheave block 22, the team can advance in any convenient direction. The cable 16 will run over its sheaves 17, 18, 19, 20, the drum 21 and the sheave in block 22 and the conveyer will thus be again drawn back to the position in the trough 3. The drum 21 serves not only as a guide drum for the cable 16 but also as a retaining means therefor. After the conveyer is returned to its proper position, the end of the rope or cable 16 will be wrapped around this drum 21 and the same turned by means of a crank handle thereon to wind up said cable thereon, so that the same will not be left lying about loosely. When the conveyer is next drawn out, the cable 16 will merely unwind from the drum 21.

From the above description it is seen that applicant has provided a simple conveyer and operating means therefor which can be inexpensively made and easily installed in practically every stable. There are no complicated parts and the device is such that it can be left out in the weather without material damage. Any desired traction means may be used to operate the conveyer and the manure and refuse from the stable can thus be easily removed.

It will, of course, be understood that various changes may be made in the form, details and arrangement of the parts without departing from the scope of applicants' invention, which, generally stated, consists in the matter shown and described and set forth in the appended claims.

What is claimed is:

1. A stable cleaning device having in combination, a conveyer adapted to be moved endwise from a receiving position in the stable to a discharging position outside thereof, an upwardly inclined trough through which the conveyer travels, said trough having its upper end substantially free so that a wagon can be disposed thereunder to receive the material discharged at the end thereof, spaced supports for said trough, a shaft longitudinally mounted on said supports, a drum on said shaft for receiving said conveyer, a windlass drum on said shaft connected to said drum adapted to receive a pull-out cable, said shaft and drums being disposed under the said trough, a pull-out cable for turning said windlass drum and a pull-back cable attached to said conveyer adapted to draw the same back to normal position.

2. A stable cleaning device having in combination, a conveyer adapted to be moved endwise from receiving position in the stable to a discharging position outside thereof, an upwardly inclined trough through which the conveyer travels, said trough being substantially free at its outer end, a guiding means for said conveyer at the upper end of said trough, a conveyer receiving drum and a windlass drum for turning the same disposed under said trough, a pull-out cable for operating said windlass drum, guiding means therefor, a pull-back cable for said conveyer, and guiding means for said latter cable.

3. A stable cleaning device having in combination, a conveyor adapted to move endwise from a receiving position in the bottom of a trough in a stable to a discharging position outside of said stable, an upwardly inclined trough through which the conveyor also travels forming a continuation of said trough and having its upper end substantially free so that a wagon can be disposed thereunder to receive the material discharged at the end thereof, a support for said trough, a drum adapted to receive the conveyor mounted on said support, a windlass drum for operating said drum also mounted on said support and adapted to receive a pull-out cable, a pull-out cable at one end of said conveyor, and a pull-back cable attached to the other end of said conveyor.

4. A stable cleaning device having in combination a conveyer adapted to be moved endwise from a receiving position in a gutter in the stable to a discharging position outside thereof, an upwardly inclined discharge trough forming a continuation of said gutter having a substantially free outer end whereby a wagon can be disposed thereunder, a support for said trough, means on said support for pulling out and winding up said conveyer, a pull-back cable for said conveyer, a guiding means for said cable disposed at one end of said gutter, overhead guiding means for said cable supported by the stable structure, and guiding means for said cable on said trough supporting means vertically alined with the guiding means therefor supported by the stable structure.

5. A stable cleaning device having in combination a conveyer adapted to be moved endwise from a receiving position in a gutter in a stable to a discharging position outside thereof, an upwardly inclined discharge trough communicating with said gutter through which the conveyer travels, a support for said trough, means on said support for pulling the conveyer to discharging position and winding up the same, a pull-back cable attached to one end of the conveyer, guiding means supported by the stable and trough supporting means for guiding said cable, a drum on said trough supporting means for guiding said cable, said drum also constituting a retaining means for holding said cable when not in use.

6. A stable cleaning device having in combination, a conveyer adapted to be moved endwise from a receiving position in the gutter of a stable to a discharging position outside of said stable, an upwardly inclined discharge trough through which the conveyer travels, means for supporting said trough, means carried by said supporting means and disposed under the trough for drawing the conveyer to discharging position and winding up the same, including a pull-out cable, a swiveled sheave block over which said cable runs, a pull-back cable for the conveyer and a swiveled sheave block on the trough supporting means over which said pull-back cable runs.

In testimony whereof we affix our signatures.

MARTIN R. HEDLUND.
H. C. HOITOMT.
WILFRED E. HEDLUND.